United States Patent
Hasan et al.

(10) Patent No.: US 11,961,010 B2
(45) Date of Patent: Apr. 16, 2024

(54) METHOD AND APPARATUS FOR PERFORMING ENTITY LINKING

(71) Applicant: Siemens Aktiengesellschaft, Munich (DE)

(72) Inventors: Rakebul Muff Hasan, Munich (DE); Ulugbek Peter Kodirov, Westend (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 194 days.

(21) Appl. No.: 17/352,431

(22) Filed: Jun. 21, 2021

(65) Prior Publication Data
US 2021/0406706 A1    Dec. 30, 2021

(30) Foreign Application Priority Data
Jun. 30, 2020   (EP) .................................... 20183123

(51) Int. Cl.
| | | |
|---|---|---|
| G06F 17/00 | (2019.01) | |
| G06F 40/284 | (2020.01) | |
| G06F 40/295 | (2020.01) | |
| G06F 40/49 | (2020.01) | |
| G06N 3/08 | (2023.01) | |
| G06N 5/022 | (2023.01) | |

(52) U.S. Cl.
CPC .......... *G06N 5/022* (2013.01); *G06F 40/284* (2020.01); *G06F 40/295* (2020.01); *G06F 40/49* (2020.01); *G06N 3/08* (2013.01)

(58) Field of Classification Search
CPC .................................. G06F 17/30; G06F 17/00
See application file for complete search history.

(56) References Cited

U.S. PATENT DOCUMENTS

| 11,556,579 B1 * | 1/2023 | Bhatia | .................... G16H 70/60 |
| 2018/0232443 A1 * | 8/2018 | Delgo | .................... G06F 16/35 |

FOREIGN PATENT DOCUMENTS

| CN | 112567355 A | * | 3/2021 | ........... G06N 3/0427 |
| CN | 111563149 B | * | 1/2023 | ......... G06F 16/3329 |
| EP | 3156949 A2 | | 4/2017 | |
| WO | WO-2019050968 A1 | * | 3/2019 | |

* cited by examiner

*Primary Examiner* — Shreyans A Patel
(74) *Attorney, Agent, or Firm* — Schmeiser, Olsen & Watts LLP

(57) ABSTRACT

Provided is a method for performing entity linking between a surface entity mention in a surface text and entities of a knowledge graph, including supplying the surface text to a contextual text representation model, pooling contextual representations of the tokens of a surface entity mention in the surface text with contextual representations of the other tokens within the surface text to provide a contextual entity representation vector representing the surface entity mention; supplying an identifier of a candidate knowledge graph entity to a knowledge graph embedding model, to provide an entity node embedding vector and combining the contextual entity representation vector with the entity node embedding vector to generate an input vector applied to a fully connected layer which provides an unnormalized output transformed by a softmax function into a normalized output processed to classify whether the surface entity mention corresponds to the candidate knowledge graph entity.

16 Claims, 3 Drawing Sheets

METHOD AND APPARATUS FOR PERFORMING ENTITY LINKING

CROSS-REFERENCE TO RELATED APPLICATIONS

This application claims priority to European Application No. 20183123.7, having a filing date of Jun. 30, 2020, the entire contents of which are hereby incorporated by reference.

FIELD OF TECHNOLOGY

The following relates to a computer-implemented method and apparatus for performing entity linking between surface entity mentions in a surface text and entities in a knowledge graph.

BACKGROUND

In entity linking, words of interest such as names of persons, locations or companies can be mapped from an input surface text to corresponding unique entities in a target knowledge graph. Words of interest can be called named entities, mentions or surface forms. Accordingly, entity linking is a task of recognizing and disambiguating named entities to a knowledge base. Entity linking provides for an automatic association of mentions of entities in a surface text data to their corresponding unique entities in the knowledge base. Typical applications for entity linking include information extraction, question answering, search, enhancing semantic understanding of texts as well as the construction of entity-centric knowledge networks.

Conventional approaches use combinations of pre-trained word representations such as word2vec and recurrent neural network RNN approaches to embed entity mentions and their contexts. In addition, existing conventional approaches for performing entity linking aggregate word representations of associated texts of the entities in the target knowledge graph in order to represent entities in the knowledge graph.

The role of entity linking is, given a knowledge graph or a knowledge base and unstructured data, e.g., text data, to detect mentions in the entities of the knowledge base in the unstructured data and link them to the correct knowledge base entry. The entity linking task is typically implementing by performing main steps of mention detection, candidate generation and entity disambiguation. During mention detection, text spans of potential entity mentions are identified. During candidate generation, entity candidates for each mention are retrieved from the knowledge base. Finally, during entity disambiguation, a mix of useful coreference and coherence features can be used together with a classifier to determine the final entity link. The final entity linking task can be modelled as a classification task where the features of the classifier form the representations of the surface text entities and the knowledge graph entities and where the classification names are either "yes" or "no".

Further possible existing approaches use entity aliases word frequencies in a text corpus along with an inverted index to generate initial ranked candidate entities before passing them to the final entity linking classifier. This approach requires pre-computation of alias word frequencies and does create a dependency on a typical text corpus with entity mentions.

SUMMARY

An aspect relates to a method and an apparatus for performing entity linking in an efficient way and capturing the text context.

Embodiments of the invention provide according to the first aspect of embodiments of the present invention a computer-implemented method for performing entity linking between a surface entity mention in a surface text and entities of a knowledge graph,
wherein the method comprises:
supplying the surface text to a contextual text representation model which calculates a contextual representation for each token within the surface text,
pooling contextual representations of the tokens of a surface entity mention in the surface text with contextual representations of the other tokens within the surface text to provide a contextual entity representation vector representing the surface entity mention with its surface text context, supplying an identifier of a candidate knowledge graph entity selected for the surface entity mention to a knowledge graph embedding model to provide an entity node embedding vector and
combining the contextual entity representation vector with the entity node embedding vector to generate an input vector applied to a fully connected layer which provides an unnormalized output transformed by a softmax function into a normalized output processed to classify whether the surface entity mention corresponds to the candidate knowledge graph entity.

The computer-implemented method according to embodiments of the present invention does in contrast to existing conventional approaches use a contextual text representation model and does fine-tune it for a final entity linking classification task using an input vector forming a combination of a contextual entity representation vector and of an entity node embedding vector.

In a possible embodiment of the computer-implemented method according to the first aspect of the present invention, the contextual entity representation vector and the entity node embedding vector are concatenated to generate the input vector applied to the fully connected layer.

In a further possible embodiment of the computer-implemented method according to the first aspect of the present invention, a dot product of the contextual entity representation vector and the entity node embedding vector is calculated and is included as an additional feature representation into the input vector applied to the fully connected layer.

In a still further possible embodiment of the computer-implemented method according to the first aspect of the present invention, text spans of the supplied surface text are annotated by named entity recognition to provide surface entity mentions within the surface text.

In a still further possible embodiment of the computer-implemented method according to the first aspect of the present invention, aliases of entities are collected and indexed using a MinHash Locality Sensitive Hashing, LSH, algorithm to create signatures of the aliases entities.

In a further possible embodiment of the computer-implemented method according to the first aspect of the present invention, similarity scores between the signatures of the knowledge graph entities and the signature of a surface entity mention are calculated and the knowledge graph entities of all the matched aliases entities having a similarity score above a threshold are selected as candidate knowledge graph entities.

In a further possible embodiment of the computer-implemented method according to the first aspect of the present invention, the aliases of entities are derived from a knowledge graph stored in a memory.

In a further possible embodiment of the computer-implemented method according to the first aspect of the present invention, the identifiers of the selected candidate knowledge graph entities are supplied sequentially to the knowledge graph embedding model to provide corresponding entity node embedding vectors.

In a further possible embodiment of the computer-implemented method according to the first aspect of the present invention, the calculated similarity scores comprise Jaccard similarity scores.

In a further possible embodiment of the computer-implemented method according to the first aspect of the present invention, the contextual text representation model comprises a bidirectional encoder representations from transformers, BERT, model.

In a still further possible embodiment of the computer-implemented method according to the first aspect of the present invention, the knowledge graph embedding model comprises a TransE model.

Embodiments of the invention provide according to the second aspect an apparatus used for performing entity linking between a surface entity mention in a surface text and entities of a knowledge graph, the apparatus comprising:
- a computer-implemented contextual text representation model adapted to calculate a contextual representation for each token within a received surface text,
- a pooling unit adapted to pool contextual representations of the tokens of a surface entity mention in the surface text with contextual representations of other tokens within the surface text to provide a contextual entity representation vector representing the surface entity mention with its surface text context,
- a computer-implemented knowledge graph embedding model adapted to provide an entity node embedding vector for a received identifier of a candidate knowledge graph entity selected for the surface entity mention and
- a processing unit adapted to combine the contextual entity representation vector with the entity node embedding vector to generate an input vector applied to a fully connected layer which provides an unnormalized output transformed by a softmax function into a normalized output processed to classify whether the surface entity mention corresponds to the candidate knowledge graph entity.

In a further possible embodiment of the apparatus according to the second aspect of the present invention, the computer-implemented contextual text representation model comprises a bidirectional encoder representations from transformers, BERT, model.

In a further possible embodiment of the apparatus according to the second aspect of the present invention, the computer-implemented knowledge graph embedding model comprises a TransE model.

In a further possible embodiment of the apparatus according to the second aspect of the present invention, the processing unit is adapted to concatenate the contextual entity representation vector and the entity node embedding vector to generate the input vector applied to the fully connected layer.

In a still further possible embodiment of the apparatus according to the second aspect of the present invention, the processing unit is adapted to calculate a dot product of the contextual entity representation vector and of the entity node embedding vector which is included as the additional feature representation into the input vector applied to the fully connected layer.

BRIEF DESCRIPTION

Some of the embodiments will be described in detail, with references to the following Figures, wherein like designations denote like members, wherein.

DETAILED DESCRIPTION

Figure 1:
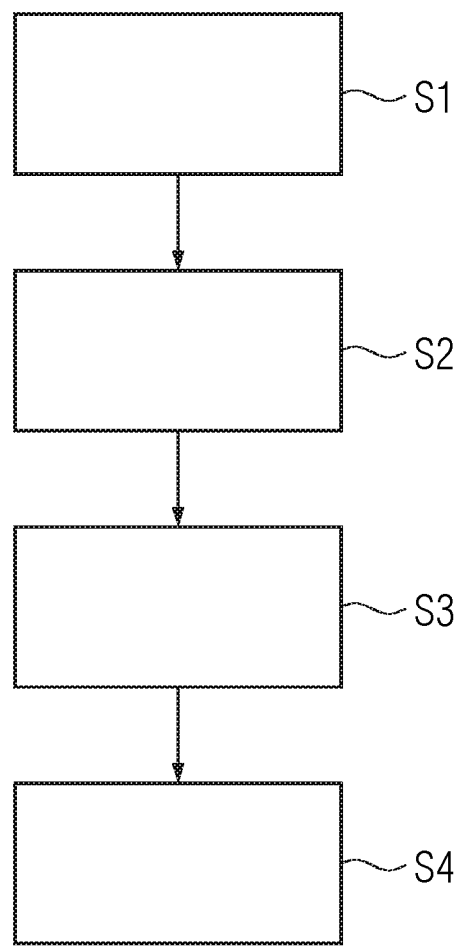
FIG. 1 shows a flowchart of a possible exemplary embodiment of a computer-implemented method for performing entity linking according to the first aspect.

As can be seen from the flowchart illustrated in FIG. 1, the computer-implemented for performing entity linking according to the first aspect of embodiments of the present invention can comprise several main steps. In a first step S1, a surface text st is supplied to a contextual text representation model CTRM which calculates a contextual representation for each token t within the surface text st. The token t can comprise a word or a word piece forming part of a word. In a possible implementation, before supplying the surface text st to the contextual text representation model CTRM, a named entity recognition NER takes place. The named entity recognition NER is provided to locate and classify named entities mentioned in the unstructured surface text st into predefined categories such as person names, organizations, locations, medical codes, time expressions, quantities, monetary values, percentages, etc. Text spans in the surface text st are annotated by the recognized entity types. These annotated text spans form the surface entity mentions SEMs. The computer-implemented method according to the first aspect of embodiments of the present invention is used for performing entity linking between a surface entity mention SEM in the received surface text st and knowledge graph entities in a predefined knowledge graph.

In a further step S2 of the computer-implemented method according to the first aspect of embodiments of the present invention, the contextual representations of the tokens t of a surface entity mention SEM in the surface text st are pooled with contextual representations of the other tokens t within the surface text st or surface text span to provide a contextual entity representation representing the surface entity mention SEM with its surface text context. Pooling can be performed in a final hidden layer of the contextual text representation model CTRM. Pooling is performed to combine representations of the tokens t for the service entity mention SEM and representations of the rest of the tokens t. This does give a representation of the surface entity mention SEM with its contexts. In a possible embodiment of the computer-implemented method according to the first aspect of the present invention, the contextual text representation model CTRM can comprise a bidirectional encoder representations from transformers, BERT, model.

Surface entity mentions SEMs within the same text span can refer to different entities as defined in the knowledge graph depending on their contexts which is also known as polysemy. Therefore, a relevant part of an effective entity linking method is a reliable context representation of the surface text st. In an embodiment of the computer-implemented method according to the first aspect of the present invention, the bidirectional encoder representations from transformers, BERT, model is used for representing surface entity mentions SEMs and their contexts. This does address the problem of polysemy. The bidirectional encoder representations from transformers, BERT, model can be pre-trained and then fine-tuned for the entity linking classification task. The learned attention is provided by the bidirectional encoder representations from transformers, BERT, model to represent context in simple terms. The bidirectional encoder representations from transformers, BERT, model used by the computer-implemented method according to the first aspect of embodiments of the present invention does learn how much attention needs to be paid to what part of a sentence or text span in a surface text st for a target classification task. The bidirectional encoder representations from transformers, BERT, model comprises a neural network NN which can be pre-trained using an extensive text corpus such as a book corpus of millions of words and/or an encyclopedia having billions of words. This pre-trained model or neural network of the bidirectional encoder representation from transformers, BERT, model is fine-tuned for the entity linking task of the method according to embodiments of the present invention. For representing surface entity mentions SEMs and their context, a bidirectional encoder representations from transformers, BERT, model can be used to learn attention weights for a final entity linking prediction task which can be modeled as a fully connected layer FCL with graph embeddings as its additional features. The use of a bidirectional encoder representations from transformers, BERT, model as the contextual text representation model CRTM allows to take advantage of rich pre-trained language representation models and to fine-tune it for the specific entity linking task at hand. The bidirectional encoder representations from transformers, BERT, model is designed to pre-train bidirectional representations from unlabeled text by jointly conditioning on both left and right context in all layers. Unlike conventional models, the bidirectional encoder representations from transformers, BERT, model used by the computer-implemented method according to embodiments of the present invention is a deeply bidirectional, unsupervised language representation pre-trained using only a plain text corpus. Whereas context-free models such as word2vec generate a single-word embedding representation for each word in the vocabulary, the bidirectional encoder representations from transformers, BERT, model is essentially bidirectional. The bidirectional encoder representations from transformers, BERT, model applies a bidirectional training of a transformer being a popular attention model to language modeling. This is in contrast to previous conventional approaches which looked at a text sequence of a surface text st either from left to right or combined left to right and right to left for training. A language model which is bidirectionally trained does have a deeper sense of language context and flow than a single direction language model. A transformer encoder used by the bidirectional encoder representations from transformers, BERT, model can read an entire sequence of words at once. In conventional context-free models such as word2vec, single-word embedding representation is generated for each word in a vocabulary. For example, the word "bank" does have the same context-free representation in "bank account" and "bank of the river". In contrast, contextual language models generate a representation of each word based also on the other words in the text span or sentence. For example, in the sentence "I accessed the bank account" a conventional unidirectional contextual model would represent "bank" based on "I accessed the" but not on "account". In contrast, the contextual text representation model CTRM used in the computer-implemented method according to embodiments of the present invention uses both the previous and the following context of the focus word, i.e., "I accessed the" and "account" starting from the bottom of a deep neural network matching the context bidirectionally. The pooling performed in step S2 of FIG. 1 has the advantage that it does reduce the dimensions of the data.

In a further step S3 of the computer-implemented method according to the first aspect of embodiments of the present invention as also illustrated in the flowchart of FIG. 1, an identifier CE-ID of a candidate knowledge graph entity CE selected for the surface entity mention SEM is supplied to a knowledge graph embedding model KGEM to provide an entity node embedding vector ENEV.

In a possible embodiment, aliases of entities AE can be collected and indexed using a MinHash Locality Sensitive Hashing, LSH, algorithm to create signatures of the knowledge graph entities. Further, similarity scores SS between the signatures of the knowledge graph entities and the signature of a surface entity mention SEM can be calculated and the knowledge graph entities CE of all the matched entities having a similarity score SS above a threshold are selected as candidate knowledge graph entities CE. The aliases of entities AE can be derived from a knowledge graph stored in a memory. The identifiers CE-ID of the selected candidate knowledge graph entities can be supplied sequentially in step S3 to the knowledge graph embedding model KGEM to provide corresponding entity node embedding vectors ENEVs. This computer-implemented knowledge graph embedding model KGEM can comprise in a possible implementation a TransE data model.

In a further step S4 of the computer-implemented method according to the first aspect of embodiments of the present invention as shown in FIG. 1, the contextual entity representation vector CERV and the entity node embedding vector ENEV are combined to generate an input vector IV which is applied to a fully connected layer FCL which provides an unnormalized output transformed by a softmax function into a normalized output processed to classify whether the surface entity mention SEM corresponds to the candidate knowledge graph entity CE.

Figure 2:
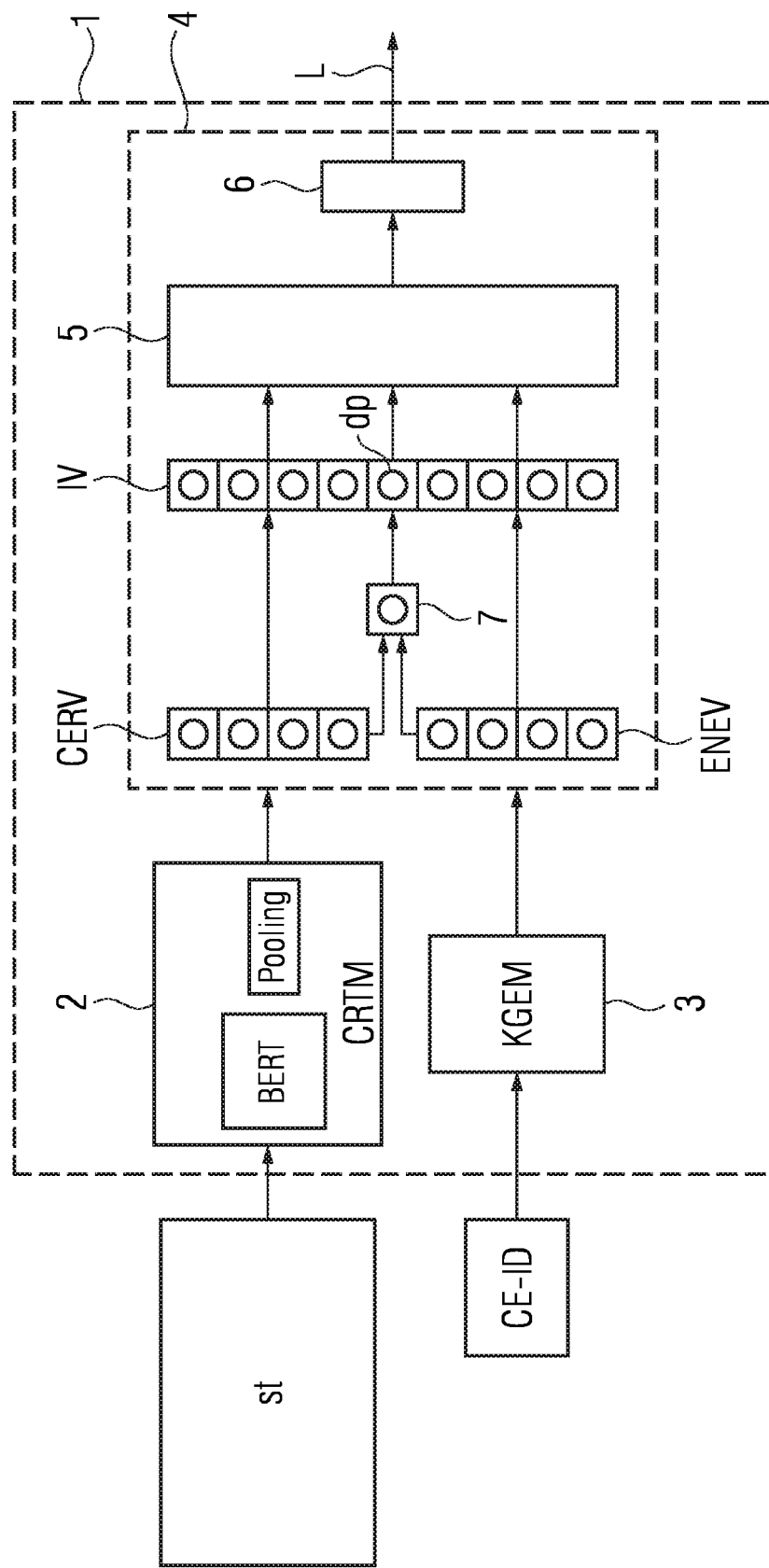
FIG. 2 shows a diagram for illustrating a possible exemplary embodiment of an apparatus for performing entity linking according to the second aspect.

In an embodiment, the contextual entity representation vector CERV and the entity node embedding vector ENEV are concatenated in step S4 to generate an input vector IV applied to the fully connected layer FCL. In a possible embodiment, a dot product of the contextual entity representation vector CERV and of the entity node embedding vector ENEV is calculated and can be included as an additional feature representation into the input vector IV applied to the fully connected layer FCL as also illustrated in FIG. 2. A dot product or scalar product is an algebraic operation that takes two equal-length sequences of numbers included in the two vectors to calculate a single number forming a feature of the input vector IV applied to the fully connected layer FCL. The fully connected layer FCL connects every neuron in one layer to every neuron in another layer. The softmax function transforms the unnormalized output of the fully connected layer FCL to a probability distribution as a normalized output.

FIG. 2 shows a diagram for illustrating a possible architecture of an apparatus 1 according to the second aspect of embodiments of the present invention used for performing entity linking between a surface entity mention SEM in a surface text st and knowledge graph entities of a knowledge graph.

As illustrated in FIG. 2, a surface text st is supplied to a contextual text representation model CTRM which is adapted to calculate a contextual representation for each token t of a surface text mention SEM in a received surface text st. The contextual text representation model CTRM comprises in the illustrated embodiment of FIG. 2 a bidirectional encoder representations from transformers, BERT, model. The contextual text representation model CTRM forms a context-aware surface entity encoder for the received surface text st. For example, the surface text st can comprise the following text: "Thanks to its wide fuel range capability and design features, the SGT-700 is a perfect choice for several onshore applications.".

Accordingly, the surface text st comprises one or more surface entity mentions SEMs such as "SGT-700". This is applied to the pre-trained and fine-tuned contextual text representation model CTRM which calculates a contextual representation for each token within the received surface text st and performs a final pooling of the tokens of the surface entity mention SEM in the received surface text st with contextual representations of other tokens within the same surface text st to provide a contextual entity representation vector CERV representing the surface entity mention SEM with its surface text context as also illustrated in FIG. 2.

Further, as also shown in FIG. 2, a candidate entity identifier CE-ID such as "Q5893981" selected for the surface entity mention SEM is applied to a knowledge graph embedding model KGEM to provide an entity node embedding vector ENEV. For representing the knowledge graph entities in the knowledge graph KG, the knowledge graph embedding model KGEM is trained separately. The candidate entity identifier CE-ID forms a result of a candidate selection process and forms one of a group of top-matched candidate entity node identifiers.

Figure 3:
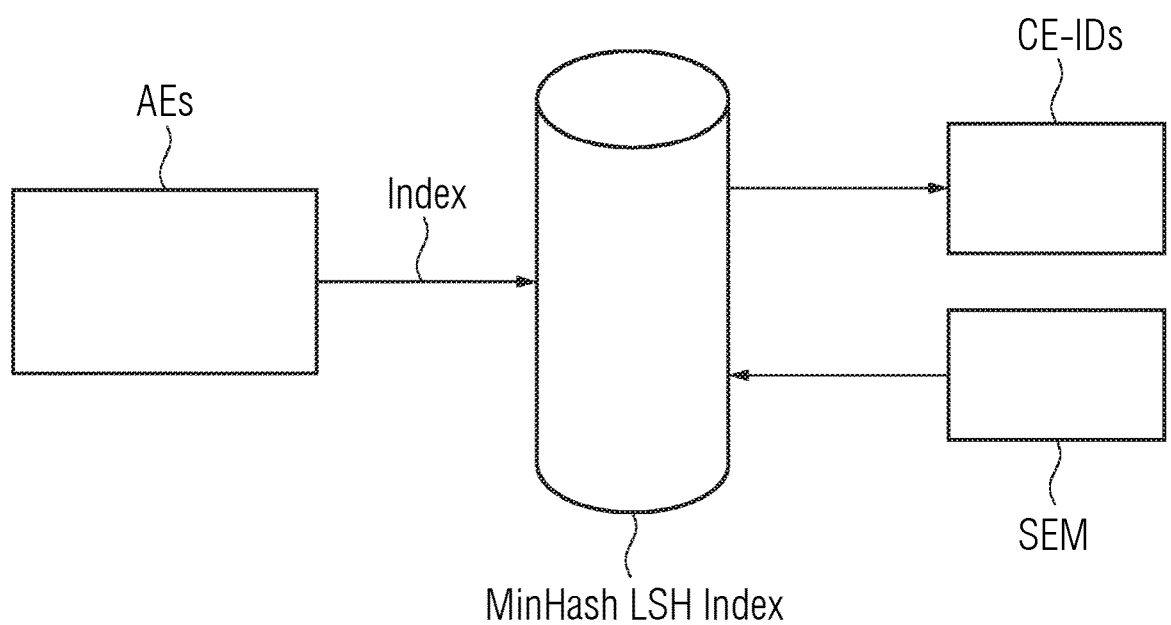
FIG. 3 shows a further diagram for illustrating the operation of a possible embodiment of the computer-implemented method according to the first aspect.

FIG. 3 illustrates the generation of candidate knowledge graph entity identifiers CE-ID in a candidate selection process. In a possible embodiment, aliases of entities AE are collected and indexed using a MinHash Locality Sensitive Hashing, LSH, algorithm to create signatures of knowledge graph entities. Further, similarity scores SS between the signatures of the knowledge graph entities and the signature of a surface entity mention SEM are calculated and the knowledge graph entities of all the matched aliases entities having a similarity score SS above a predefined threshold value TH can be selected as candidate knowledge graph entities CE. Identifiers CE-IDs of these candidate knowledge graph entities CE are then supplied sequentially to the knowledge graph embedding model KGEM shown in FIG. 2.

Accordingly, for a surface entity mention SEM, a first set of candidate knowledge graph entities CE which potentially correspond to the surface entity is found. The aliases of entities AE are collected first. In a possible embodiment, the aliases of entities AE can be derived from synonym labels in a target knowledge graph and the labeled training data where surface entity mentions SEMs are labeled with knowledge graph entities. The collected aliases of entities AE are indexed in a possible embodiment using a MinHash Locality Sensitive Hashing, LSH, algorithm. The keys in this index are the entity of aliases AE which have been collected previously. The values are the entity identifiers in the respective knowledge graph. FIG. 3 shows the overall candidate selection process.

The general idea underlying the candidate selection is to perform a fuzzy search over the aliases of entity AE. The used MinHash algorithm enables the creation of signatures for sets. In order to match a set in a collection of sets, it is possible to compute in a possible implementation a Jaccard similarity as a similarity score between the signature of the querying set and the signatures of the other sets in the collection. Further, an approach using only MinHash provides linear query costs. However, a sub-linear query cost is preferred as the number of aliases of entities AE and entities in the knowledge graph KG can be very high. In an embodiment, the aliases of entities AE are collected and indexed using a MinHash Locality Sensitive Hashing, LSH, algorithm to create signatures of the knowledge graph entities. This MinHash Locality Sensitive Hashing, LSH, algorithm avoids computing a similarity for every pair of sets or characters. It does divide the set signatures into bands and computes a similarity of a pair only if they have at least one band in common. Due to this, the MinHash Locality Sensitive Hashing, LSH, algorithm provides for sub-linear query costs.

Each alias of entity AE comprises a set of words or word pieces, i.e., tokens t. All aliases of entities AE are indexed with the MinHash Locality Sensitive Hashing, LSH, algorithm. Further, a dictionary is kept where one can look up a given alias of entity to find its corresponding knowledge graph entities. As a final result of the overall candidate selection process as illustrated in FIG. 3, the associated knowledge graph entity ID, i.e., the candidate entity CE-ID corresponding to the matched aliases of entities AE are output having a similarity score SS above a predefined threshold. In an embodiment, the calculated similarity score SS can comprise a Jaccard similarity score JSS. This approach covers both exact and fuzzy aliases matches. As a result, the candidate entity-identifiers CE-IDs of the top-matched candidate knowledge graph entities can be sequentially supplied to the knowledge graph embedding model KGEM as illustrated in FIG. 2 to calculate corresponding entity node embedding vectors ENEVs one after the other. The computer-implemented knowledge graph embedding model KGEM is adapted to provide an entity node embedding vector ENEV for the received identifier CE-ID at one of the candidate knowledge graph entities CE selected for the respective surface entity mention SEM.

The size of the contextual entity representation vector CERV output by the contextual text representation model CTRM and the size of the entity node embedding vector ENEV output by the knowledge graph embedding model KGEM is equal and can comprise in a possible implementation 768 vector entries or vector elements. Each vector element comprises latent feature representation. Both calculated vectors, i.e., the contextual entity representation vector CERV and the entity node embedding vector ENEV, are supplied to a processing unit 4 adapted to combine the contextual entity representation vector CERV with the entity node embedding vector ENEV to generate an input vector IV applied to a fully connected layer (FCL) 5 of the apparatus 1. The fully connected layer 5 generates an unnormalized output which is transformed by a following softmax function 6 into a normalized output processed to classify whether the surface entity mention SEM in the received surface text st does indeed correspond to the selected candidate knowledge graph entity CE. In an embodiment as illustrated in the diagram of FIG. 2, the processing unit 4 is adapted to concatenate the received contextual entity representation vector CERV and the received entity node embedding vector ENEV to generate the input vector IV applied to the following fully connected layer 5 of the apparatus 1 as shown in FIG. 2. In a possible implementation, the processing unit 4 has an entity 7 adapted to calculate also a dot product of the contextual entity representation vector CERV and of the entity node embedding vector ENEV. The calculated dot product dp is then included as an additional feature representation into the input vector IV applied to the fully connected layer 5. The dot product feature represents a measure of the relationship between the entity node and the surface entity mention SEM in an input pair.

The fully connected layer 5 performs the final linking classification task using in an embodiment a linear classifier. The softmax activation function 6 provides probabilities for the "yes" and "no" classes, i.e., whether the surface entity mention SEM corresponds to the candidate knowledge graph entity CE or not. For example, a label L can be output which indicates whether the surface entity mention SEM "SGT-700" in the received surface text st corresponds to a candidate knowledge graph node in the existing knowledge graph KG.

The candidate selection using the MinHash Locality Sensitive Hashing, LSH, algorithm with a Jaccard similarity score JSS is adapted to deal with not only exact matches but also syntactically similar words. The candidate selection process illustrated in FIG. 3 does not require prior probabilities which removes the dependency on prior probability computation steps. For representing surface entity mentions SEMs and their contexts in the surface text st, in an embodiment, a bidirectional encoder representations from transformers, BERT, model is used. This model learns attention weights for the final entity link prediction task which is modeled as the fully connected layer (FCL) 5 with graph embeddings as additional features. Using the bidirectional encoder representations from transformers, BERT, model allows to take advantage of its rich pre-trained language representation models and to fine-tune it for the entity linking task performed by the method according to embodiments of the present invention.

Knowledge graph embedding is used for representing entities in the knowledge base, i.e., the catalogued entities. The knowledge graph entity representations used in the method according to embodiments of the present invention are rich in a sense that they can represent both their descriptions and their network structure in the target knowledge graph. The computer-implemented method and apparatus 1 for performing entity linking can be used for different use cases or applications, in particular information extraction, question answering, search, enhancing semantic understanding of texts as well as the construction of entity-centric knowledge networks. The computer-implemented method can be used as a software tool for performing entity linking between surface entity mentions SEMs in a surface text st and entities of a stored knowledge graph. The software tool receives via an input interface a surface text st and has access to a memory where a knowledge graph is stored. The computer-implemented method outputs a classification or label whether a surface entity mention SEM within the received surface text st does correspond with a selected candidate entity CE.

Depending on the classification result, further steps can be triggered. For instance, if a surface entity mention SEM such as "SGT-700" is recognized in the received surface text st, different kinds of actions can be triggered automatically. For instance, a user may receive via a graphical user interface an indication that a surface entity mention SEM has been recognized in the received surface text st. Further, automatic actions can be triggered if a surface entity mention SEM is found within a received surface text st such as the output of additional information about the recognized surface entity mention SEM or the automatic triggering of control signals used to control a process such as a maintenance or manufacturing process. If the surface text st comprises a documentation for performing repair or maintenance services, an identified surface entity mention SEM within the surface text st may trigger the automatic provision of a tool which can be used to maintain, repair or replace the recognized mentioned surface entity by a user. Accordingly, in a possible embodiment, the entity linking result output by the softmax function 6, i.e., the classification labels L, can trigger different kinds of activities automatically having a tangible impact on the physical environment of the respective process or use case.

The entity linking provided by the method according to embodiments of the present invention can map ambiguous named entities to unique identifiers in an extensive knowledge database. The entity linking can be performed in a possible embodiment with low latency in real time. Consequently, the triggering of activities using actuators can also be performed in a possible implementation using the labels L provided by the entity linking method in real time. In a possible embodiment, the knowledge graph embedding model KGEM can comprise a TransE model used for learning low-dimensional embeddings of entities. Entity-relational data refers to directed graphs whose nodes correspond to entities and edges of the form (head, label, tail) wherein each indicates that there exists a relationship of name label between the entities head and tail. In the TransE model, relationships are represented as translations in the embedding space, i.e., if (head, label, tail) holds, then the embedding of the tail entity will be close to the embedding of the head entity plus some vector that depends on the relationship. This approach reduces the set of parameters as it learns only one low-dimensional vector for each entity and each relationship.

The computer-implemented models used by the apparatus 1 according to embodiments of the present invention can be adapted to the different entity linking use cases.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for performing entity linking between a surface entity mention in a surface text and entities of a knowledge graph, the method comprising:
   supplying the surface text to a contextual text representation model, which calculates a contextual representation for each token within the surface text;
   pooling contextual representations of the tokens of a surface entity mention in the surface text with contextual representations of the other tokens within the surface text to provide a contextual entity representation vector representing the surface entity mention with a surface text context;
   supplying a candidate entity identifier of a candidate knowledge graph entity, selected for the surface entity mention using a method comprising a sub-linear query cost as a result of a candidate selection process forming one of a group of top-matched candidate entity node identifiers, for the surface entity mention to a knowledge graph embedding model, to provide an entity node embedding vector; and combining the contextual entity representation vector with the entity node embedding vector to generate an input vector applied to a fully connected layer, which provides an unnormalized output transformed by a softmax function into a normalized output processed to classify whether the surface entity mention corresponds to the candidate knowledge graph entity.

2. The computer-implemented method according to claim 1, wherein the contextual entity representation vector and the entity node embedding vector are concatenated to generate the input vector applied to the fully connected layer.

3. The computer-implemented method according to claim 2, wherein a dot product of the contextual entity representation vector and the entity node embedding vector is calculated and is included as an additional feature representation into the input vector applied to the fully connected layer.

4. The computer-implemented method according to claim 1, wherein text spans of the supplied surface text are annotated by named entity recognition to provide surface entity mentions, within the surface text.

5. The computer-implemented method according to claim 1, wherein aliases of entities are collected and indexed using a MinHash Locality Sensitive Hashing algorithm to create signatures of the knowledge graph entities.

6. The computer-implemented method according to claim 5, wherein similarity scores between the signatures of the knowledge graph entities and the signature of a surface entity mention are calculated and the knowledge graph entities of all the matched aliases entities having a similarity score above a threshold are selected as candidate knowledge graph entities.

7. The computer-implemented method according to claim 5, wherein the aliases of entities are derived from a knowledge graph stored in a memory.

8. The computer-implemented method according to claim 5, wherein the candidate entity identifier of the selected candidate knowledge graph entity is supplied sequentially to the knowledge graph embedding model to provide corresponding entity node embedding vectors.

9. The computer-implemented method according to claim 6, wherein the calculated similarity score comprises a Jaccard similarity score.

10. The computer-implemented method according to claim 1, wherein the contextual text representation model comprises a bidirectional encoder representations from transformers model.

11. The computer-implemented method according to claim 1, wherein the knowledge graph embedding model comprises a TransE model.

12. An apparatus used for performing entity linking between a surface entity mention in a surface text and entities of a knowledge graph, the apparatus comprising:

a computer-implemented contextual text representation model adapted to calculate a contextual representation for each token within a received surface text and having a pooling unit adapted to pool contextual representations of the tokens of a surface entity mention in the surface text with contextual representations of other tokens within the surface text to provide a contextual entity representation vector representing the surface entity mention with a surface text context;

a computer-implemented knowledge graph embedding model, KGEM, adapted to provide an entity node embedding vector for a received candidate entity identifier of a candidate knowledge graph entity, selected for the surface entity mention using a method comprising a sub-linear query cost as a result of a candidate selection process forming one of a group of top-matched candidate entity node identifiers, for the surface entity mention; and a processing unit adapted to combine the contextual entity representation vector with the entity node embedding vector to generate an input vector applied to a fully connected layer which provides an unnormalized output transformed by a softmax function into a normalized output processed to classify whether the surface entity mention corresponds to the candidate knowledge graph entity and to output a corresponding label.

13. The apparatus according to claim 12, wherein the computer-implemented contextual text representation model comprises a bidirectional encoder representations from transformers model.

14. The apparatus according to claim 12, wherein the computer-implemented knowledge graph embedding model comprises a TransE model.

15. The apparatus according to claim 12, wherein the processing unit is adapted to concatenate the contextual entity representation vector and the entity node embedding vector to generate the input vector applied to the fully connected layer of the apparatus.

16. The apparatus according to claim 12, wherein the processing unit comprises a processor adapted to calculate a dot product of the contextual entity representation vector and of the entity node embedding vector wherein the calculated dot product is included as the additional feature representation into the input vector applied to the fully connected layer of the apparatus.

* * * * *